United States Patent [19]

Markunas

[11] Patent Number: 5,062,265
[45] Date of Patent: Nov. 5, 1991

[54] HYDROMECHANICAL CONTROL OF DIFFERENTIAL PRESSURE ACROSS A VARIABLE DISPLACEMENT HYDRAULIC MOTOR

[75] Inventor: Albert L. Markunas, Roscoe, Ill.
[73] Assignee: Sundstrand Corporation, Rockford, Ill.
[21] Appl. No.: 387,986
[22] Filed: Aug. 1, 1989
[51] Int. Cl.$^5$ .......................... F15B 11/02; F03C 1/40
[52] U.S. Cl. ....................................... 60/450; 60/451; 60/327
[58] Field of Search .......................... 60/450, 451, 327

[56] References Cited

U.S. PATENT DOCUMENTS

| | | | |
|---|---|---|---|
| 2,941,365 | 6/1960 | Carlson et al. | 60/451 X |
| 3,465,680 | 3/1967 | Saila | 91/505 |
| 3,635,021 | 1/1972 | McMillen et al. | 60/450 |
| 4,478,136 | 10/1984 | Heiser et al. | 91/506 |
| 4,768,340 | 9/1988 | Hamilton | 60/451 X |
| 4,907,408 | 3/1990 | Barker | 60/451 |

FOREIGN PATENT DOCUMENTS 1013236 7/1977 Canada .
57-140576 2/1956 Japan .

Primary Examiner—Edward K. Look
Assistant Examiner—George Kapsalas
Attorney, Agent, or Firm—Antonelli, Terry, Stout & Kraus

[57] ABSTRACT

A method and apparatus for controlling the differential hydraulic fluid pressure ($\Delta P$) across a variable displacement hydraulic motor (10) wherein the displacement of the motor is adjusted as a function of the differential fluid pressure across the motor to maintain a near constant differential pressure across the motor when the motor is operating under an opposing load and in an intermediate region of its speed-load torque profile (FIG. 4). In order to minimize the flow requirements of the motor, the displacement of the motor is reduced to minimum when the motor is operating under an aiding load or no load. The method and apparatus are useful in an apparatus for mechanically actuating a device (22) with the variable displacement hydraulic motor (10) driven by hydraulic fluid from a hydraulic power supply (25) such as an aircraft power supply for operating components of the aircraft, e.g. rudder, wing, etc.

13 Claims, 3 Drawing Sheets

HYDROMECHANICAL CONTROL OF DIFFERENTIAL PRESSURE ACROSS A VARIABLE DISPLACEMENT HYDRAULIC MOTOR

BACKGROUND OF THE INVENTION

1. Field of the Invention

The present invention relates to a method and apparatus for controlling the differential hydraulic pressure across a variable displacement hydraulic motor which can be used for mechanically actuating a device such as a component on an aircraft.

2. Description of the Prior Art

Aircraft include devices such as flaps, rudders, etc. which must be mechanically actuated during flight to maintain proper control of the aircraft. It is known that these devices can be mechanically actuated by means of a hydraulic motor which is driven by a hydraulic power supply of the aircraft.

It is also known to employ a variable displacement hydraulic motor to mechanically actuate these kinds of devices on an aircraft. The speed-load torque profile of the variable displacement hydraulic motor is such that at high torque and low speed, the motor operates at maximum displacement and near its high speed at minimum displacement. Intermediate the two, the motor operates with a variable displacement, the displacement varying to maintain a constant flow. To maintain a constant flow, it is necessary to maintain a near constant differential pressure across the motor.

A known apparatus for controlling the differential hydraulic pressure across the variable displacement hydraulic motor is shown in FIG. 1 of the drawings. As illustrated therein, the variable displacement hydraulic motor 10 comprises a wobbler 11 which is adjustable for controlling the displacement of the motor. A high-pressure control piston 12 and a low-pressure control piston 13 are operatively connected to the wobbler for adjusting the wobbler to respectively increase and decrease the motor displacement with actuation of the pistons. Pressurized hydraulic fluid is supplied to and returned from the motor 10 by way of the lines $b_1$ and $b_2$. A shuttle valve 14 is acted upon by the pressurized hydraulic fluid in both of the lines $b_1$ and $b_2$ such that the valve moves to allow communication between the one of the lines $b_1$ and $b_2$ having the highest pressure and high pressure line 15 downstream of the shuttle valve 14. The other of the lines $b_1$ and $b_2$, having lower pressure is communicated with low pressure line 16 by way of the shuttle valve 14.

The high pressure fluid from high pressure line 15 and the low pressure fluid from low pressure line 16 are communicated to opposite sides of the spool valve of a compensator valve 17. When the differential pressure $\Delta P$ across the motor 10 exceeds a predetermined amount, the high pressure in line 15 overcomes the upward force on the spool valve of compensator valve 17 caused by the low pressure from line 16 and the force of a spring in the compensator valve to move the spool valve downward as shown in FIG. 1 thereby communicating the high pressure in line 15 with the high pressure control piston 12. The low pressure in line 16 is communicated with the low-pressure control piston 13 as shown in FIG. 1. Introduction of high pressure fluid to the control piston 12 overcomes the opposing force on the wobbler 11 from the low pressure control piston 13 and of spring 18 to increase the displacement of the motor 10 which, in turn, will decrease the pressure differential $\Delta P$ between the lines $b_1$ and $b_2$ of the motor 10. In the aforementioned intermediate region of the motor's speed-load torque profile $\Delta P$ will decrease until there is a force balance on the spool of the compensator valve 17. This will occur in the vicinity of a predetermined set point. The pressure differential $\Delta P$ will exceed the predetermined amount when either a high opposing load or a high aiding load is placed upon the output shaft 19 of the motor 10, resulting in an increase in the motor displacement with both opposing and aiding loads.

The ever increasing performance requirements of advanced aircraft are placing even more demanding peak flow requirements on the hydraulic power supplies. Fully variable displacement motor driven actuation systems offer the potential to significantly reduce the peak flow requirement but do so at the expense of simplicity and cost. There is a need for an improved mechanically controlled variable displacement hydraulic motor driven actuation arrangement which realizes much of the hydraulic flow savings of the fully variable scheme while maintaining the simplicity, low cost and reliability of conventional actuation systems.

Other examples of hydraulic systems employing variable displacement hydraulic motors and control arrangements therefor are shown in U.S. Pat. Nos. 3,465,680; 3,635,021 and 4,478,136.

SUMMARY OF INVENTION

An object of the present invention is to provide an improved method and apparatus for controlling the differential hydraulic pressure across a variable displacement hydraulic motor and a method and an apparatus for mechanically actuating a device employing the same, which reduce the peak flow requirements on the hydraulic power supply during operation of the motor. This enables additional flow to be available to operate other actuators or devices and reduces the demand on heat exchangers required to remove excess heat generated by the hydraulic controls.

These and other objects are attained by the apparatus of the invention for controlling the differential hydraulic pressure across a variable displacement hydraulic motor. The apparatus comprises means for adjusting the displacement of the motor as a function of the differential pressure across the motor to maintain a near constant differential pressure across the motor when the motor is operating under an opposing load, and means for reducing the displacement of the motor to a minimum when the motor is operating under an aiding load. The means for reducing also reduces the displacement of the motor to a minimum when the motor is operating under no load. The apparatus further comprises means for limiting the maximum flow of the hydraulic fluid from the motor to thereby limit the maximum operating speed of the motor. By minimizing the displacement, hence flow of hydraulic fluid, during aiding load and no load or light load operations, the flow required for the hydraulic motor can be minimized thereby making the hydraulic fluid from a hydraulic supply available to other hydraulic motors for actuating other devices, and reducing the heat generated because of high fluid pressure differentials across control valves in the apparatus.

More specifically, according to a disclosed form of the invention, the apparatus controls the differential hydraulic pressure across a variable displacement hydraulic motor having a wobbler which is adjustable for controlling the displacement of the motor. The apparatus comprises first and second control pistons, means operatively connecting each of the pistons to the wobbler for adjusting the wobbler to respectively increase and decrease the motor displacement with actuation of the pistons, means responsive to the pressure difference between an input hydraulic fluid pressure to the motor and an output hydraulic fluid pressure from the motor for communicating the first control piston with the higher pressure one of the input hydraulic fluid pressure and the output hydraulic fluid pressure when the fluid pressure differential exceeds a predetermined amount, and means for communicating the second control piston with the pressure of the output hydraulic fluid.

According to an additional feature of the invention, the apparatus comprises valve means for selectively changing the direction of hydraulic fluid flow through the motor for reversing the direction of operation of the motor. The means for communicating the second control piston with the output hydraulic fluid communicates with the output hydraulic fluid in a fluid return line downstream of the valve means.

The disclosed invention is also particularly directed to an apparatus for mechanically actuating a device, such as a flap, rudder, etc. on an aircraft, with a variable displacement hydraulic motor driven by hydraulic fluid from an aircraft hydraulic power supply. The apparatus comprises a device to be mechanically actuated, a variable displacement hydraulic motor, means for mechanically connecting the output of the motor to the device for actuating the device, a hydraulic power supply for supplying hydraulic fluid for driving the motor, fluid passage means for supplying pressurized fluid to the motor from the hydraulic power supply and for returning pressurized fluid from the motor to the hydraulic power supply, and means for controlling the differential hydraulic pressure across the motor by adjusting the displacement of the motor to maintain a near constant differential pressure across the motor when the motor is operating under an opposing load in an intermediate region of its speed-load torque profile, and including means for reducing the displacement of the motor to a minimum when the motor is operating under an aiding load.

Thus, a method of controlling the differential hydraulic pressure across a variable displacement hydraulic motor according to the invention comprises the step of adjusting the displacement of the motor as a function of differential pressure across the motor for maintaining a near constant differential pressure across the motor, and the steps of reducing the displacement of the motor to a minimum when the motor experiences an aiding load thereby minimizing the flow requirements of the motor. The step of reducing the displacement of the motor to a minimum is also preferably performed when no load or a light opposing load is applied to the motor. The method further includes the step of limiting the maximum motor speed by limiting the flow of hydraulic fluid returning from the motor to a hydraulic fluid supply.

According to the disclosed embodiment, the method is for controlling the differential hydraulic pressure across a variable displacement hydraulic motor having a wobbler which is adjustable for controlling the displacement of the motor and first and second hydraulic pressure responsive control piston means for adjusting the wobbler to respectively increase and decrease the motor displacement depending upon the hydraulic pressures applied to the piston means. The method comprises the steps of applying hydraulic fluid pressure from the higher of an input hydraulic fluid pressure to the motor and output hydraulic fluid pressure from the motor to the first control piston means when the pressure difference between the input hydraulic fluid pressure and the output hydraulic fluid pressure exceeds a predetermined amount, while, in the case of an opposing load on the motor, applying hydraulic fluid pressure from the lower of the input hydraulic fluid pressure and the output hydraulic fluid pressure to the second control piston means whereby the first control piston means overrides the second control piston means and the wobbler is adjusted to increase the motor displacement, and while, in the case of an aiding load on the motor, applying hydraulic fluid pressure from the higher hydraulic fluid pressure to the second control piston means. The second control piston means has a slightly or somewhat larger piston face area than that of the first control piston means whereby the first control piston means is overridden by the second control piston means so that the wobbler is adjusted to decrease the motor displacement to a minimum thereby minimizing the hydraulic fluid flow requirements of the motor.

These and other objects, features and advantages of the present invention will become more apparent from the following description when taken in connection with the accompanying drawings which show, for purposes of illustration only, one preferred embodiment in accordance with the present invention.

DETAILED DESCRIPTION OF THE PREFERRED EMBODIMENT

Figure 2:
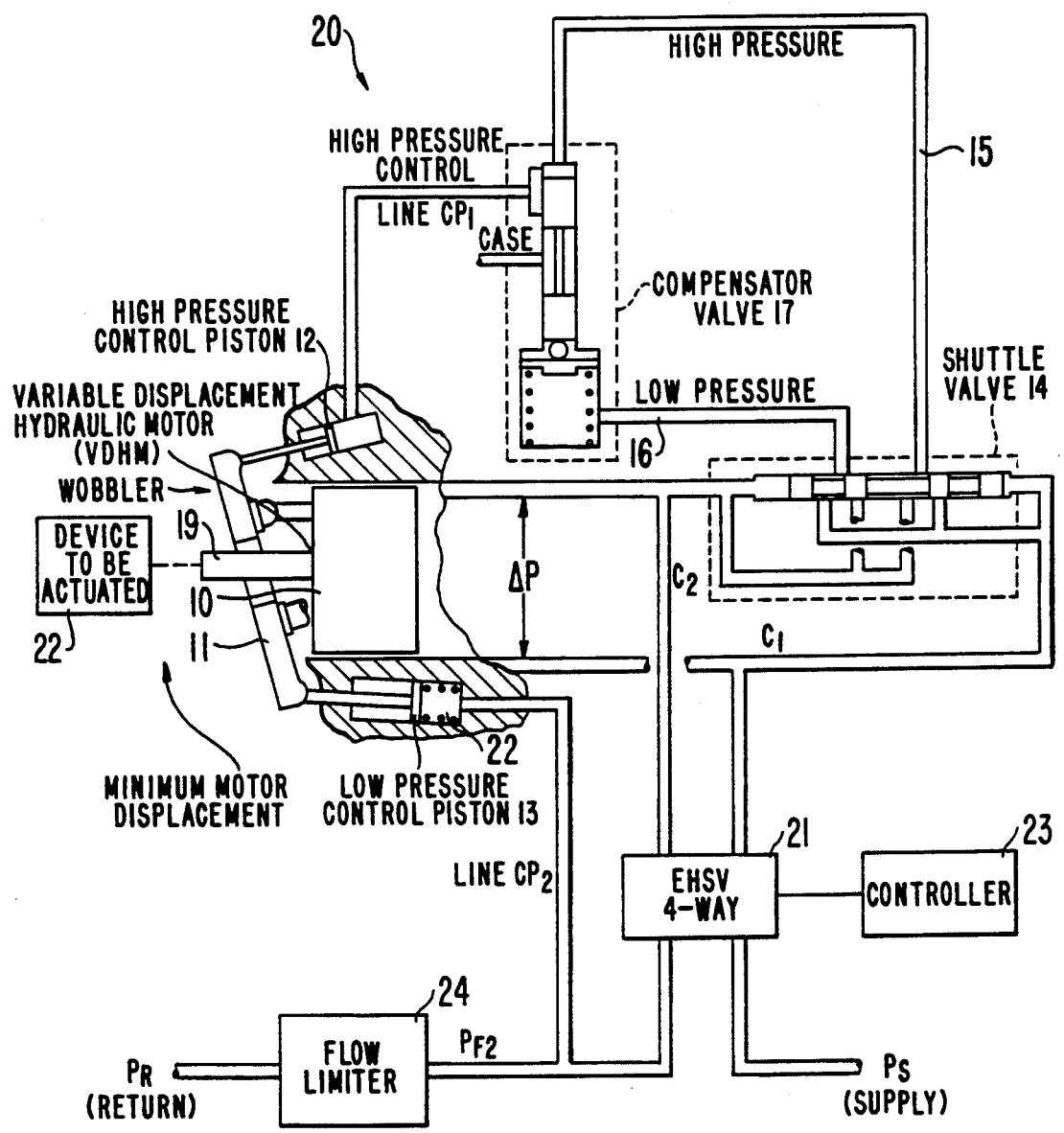
FIG. 2 is a schematic diagram, partially in cross-section, of an apparatus according to the invention for controlling the differential hydraulic pressure across a variable displacement hydraulic motor.

Referring now to the drawings, an apparatus 20 according to the invention for controlling the differential hydraulic pressure $\Delta P$ across a variable displacement hydraulic motor 10 is shown in FIG. 2. The motor 10 comprises a wobbler 11 with a high pressure control piston 12 and a low pressure control piston 13 being operatively connected thereto for adjusting the wobbler to respectively increase and decrease the motor displacement with actuation of the pistons. A shuttle valve 14 communicates the higher pressure line of the hydraulic input and output lines $C_1$ and $C_2$ for the motor 10 with the high pressure line 15 while communicating the lower pressure line of $C_1$ and $C_2$ with low pressure line 16.

The spool valve of compensator valve 17 is moved downwardly to communicate the high pressure line 15 with the high pressure control piston 12 when the pressure differential $\Delta P$ between the input and output of the motor 10 exceeds a predetermined set amount so as to overcome the biasing force of the spring within the compensator valve 17 and the low pressure on the opposing side of the spool valve of the compensator valve. High pressure on the control piston 12 biases the wobbler 11 in a direction for increasing the displacement of the motor 10. The lower pressure control piston 13 is communicated with the output hydraulic fluid from the motor 10 by way of the line $CP_2$, a four-way electrohydraulic valve 21 and one of the lines $C_1$ and $C_2$ depending upon the position of the valve 21.

As a result of this arrangement, in the case of an opposing load on the output shaft 19 of the motor 10 from the device to be actuated 22, where line $C_1$ is inputting hydraulic fluid to the motor from a supply, the pressure in the line $C_1$ will exceed that in the return line $C_2$ and the lower fluid pressure in line $C_2$ will be communicated with the low pressure control piston 13 by way of the valve 21 and line $CP_2$. The application of high pressure to the control piston 12 will overcome the opposing force from the lower fluid pressure in the control piston 13 and spring 22 therein to increase the displacement of the motor 10. However, if an aiding load is applied to the shaft 19 from the device 22 to be actuated, the pressure in the output line $C_2$ will be higher than the pressure in the input line $C_1$ due to the action of the flow limiter 24. Since according to the invention the high pressure in line $C_2$ will be communicated with both the control piston 12 and the control piston 13, and because the area of the face of the control piston 13 is somewhat greater than that of the control piston 12, the force from the control piston 13 will override that of the control piston 12 and adjust the wobbler 11 for minimizing the displacement of the motor 10 thereby minimizing the flow requirements of the motor during operation with an aiding load. As noted above, this offers the advantages of reducing peak flow requirements and allowing available hydraulic fluid to be supplied to other hydraulic apparatus in the aircraft. The lower flow will also will reduce the heat generated by any restrictions in the flow lines caused by the setting of the four-way valve 21 which is responsive to controller 23 and, in turn, the flight instructions from the pilot, for example.

A flow limiter 24 is provided in the hydraulic fluid return line downstream of the four-way valve 21 for limiting the maximum flow of hydraulic fluid from the motor to thereby limit the maximum operating speed of the motor. In particular, the flow limiter 24 limits the flow from the motor 10 of the apparatus 20 to a predefined value and prevents the motor from exceeding the speed defined by $Q_L/D_{min}$ at steady state, where QL equals flow limited (inch cubed/min) and $D_{min}$ equals minimum displacement (inch cubed/rev).

Figure 1:
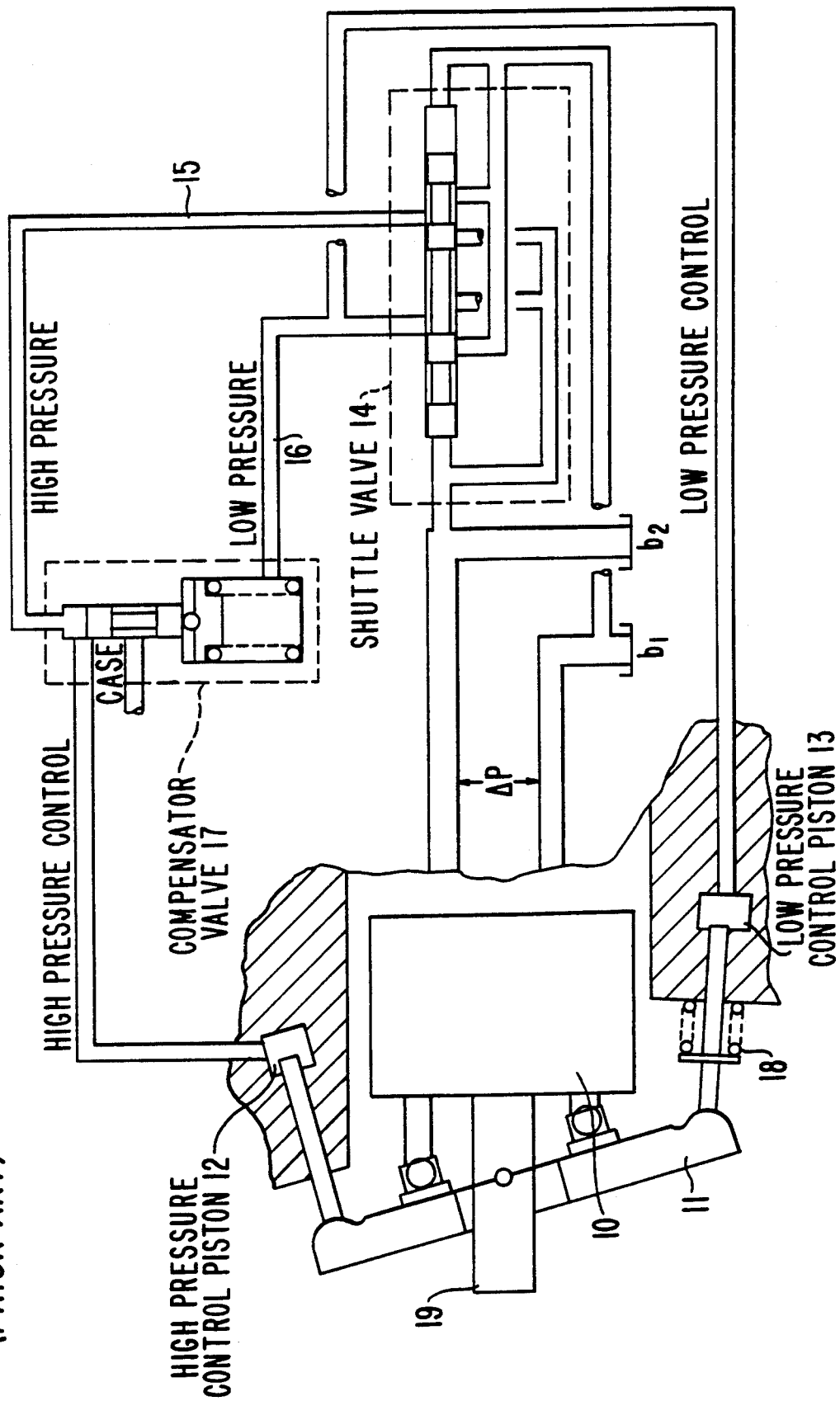
FIG. 1 is a schematic illustration, partially in cross-section, of a known apparatus for controlling the differential hydraulic pressure across a variable displacement hydraulic motor.

The shuttle valve 14 of the apparatus 20 of FIG. 2 operates like the shuttle valve 14 in the prior art apparatus of FIG. 1. Specifically, the shuttle valve 14 in FIG. 2 switches the lines 15 and 16 to lines $C_1$ and $C_2$ such that line 15 has the highest pressure of $C_1$ and $C_2$ while line 16 has the lower pressure as noted above. Likewise, the compensator valve 17 of the apparatus 20 of FIG. 2 operates like the corresponding compensator valve in the apparatus of FIG. 1. The compensator valve 17 comprises a spool valve spring loaded at one end as generally shown in the drawing. The valve controls pressure in the line $CP_1$. The valve vents to case or return line. As previously indicated, the low pressure in line 16 and the high pressure in line 15 communicate with respective ends of the spool valve of the compensator valve. The spring pre-load of the valve is sized such that the valve opens to communicate line $CP_1$ with line 15 at a set pressure $\Delta P$ across the motor.

Figure 3:
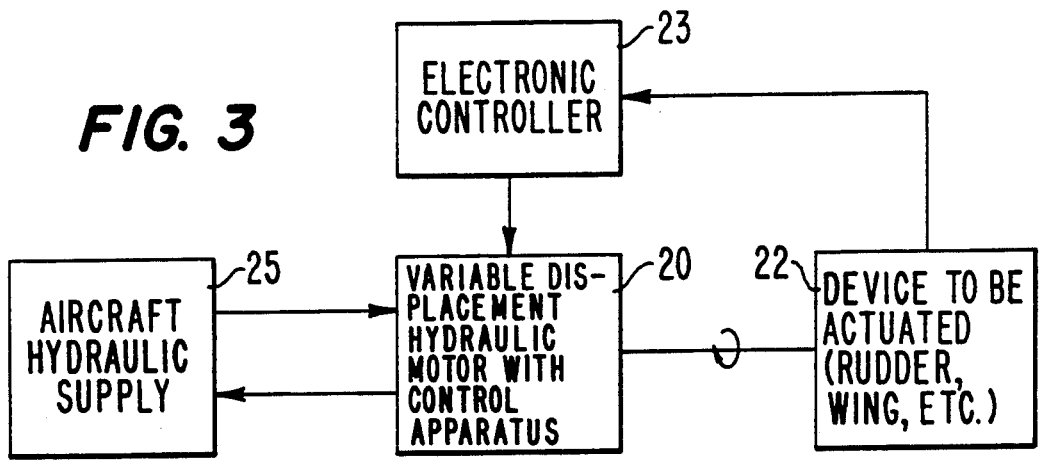
FIG. 3 is a diagram of an apparatus for mechanically actuating a device with a variable displacement hydraulic motor driven by hydraulic fluid from a hydraulic power supply according to the invention.

The block diagram of the apparatus of the invention as shown in FIG. 3 illustrates an aircraft hydraulic supply 25 which supplies pressurized fluid for driving the variable displacement hydraulic motor 10 of the apparatus 20 as shown in FIG. 2. The mechanical output of the motor 10 is employed to actuate a device 22 of the aircraft such as a rudder, flap, etc. The electronic controller 23 receives feedback information concerning the position or other condition of the device to be actuated. This information and control instructions from the pilot, for example, determine the output control signals from the controller 23 to the four-way electrohydraulic servo valve 21 which controls the position of the actuator.

Figure 4:
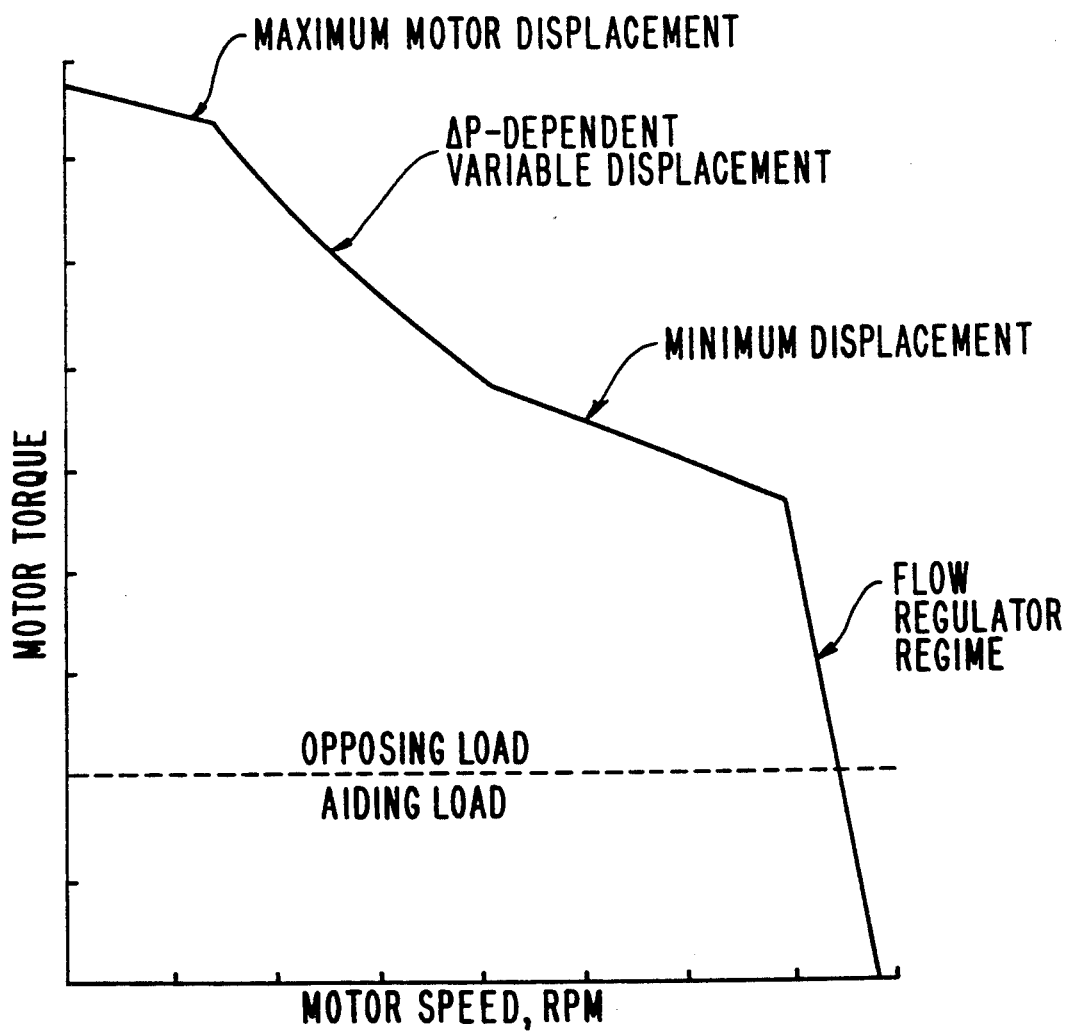
FIG. 4 is a characteristic speed-load torque profile of a hydraulic motor according to the present invention.

The characteristic speed-load torque profile of a hydraulic motor 10 of the apparatus 20 of the invention is shown in FIG. 4. As seen therein, there are four distinct regions. Namely, at high torque and low speed the motor operates at maximum displacement and near the high speed end at minimum displacement. Intermediate to the two, the motor operates with a variable displacement varying to maintain a constant flow. To maintain a constant flow, it is necessary to maintain a near constant differential pressure across the motor. Above a predefined speed, the motor operates at minimum displacement but at a constant flow, limited by the flow limiter 24. The above-described apparatus 20 of the invention controls the differential pressure $\Delta P$ across the motor near constant in the intermediate, variable displacement region of its speed-load torque profile, and also drives the motor to minimum displacement at zero or aiding load or to maximum displacement if the opposing load exceeds a predefined value.

Illustratively, upon application of an opposing load to the output shaft 19 of the motor 10 of the apparatus 20 in FIG. 2, the pressure differential $\Delta P$ across the hydraulic input and output of the motor will increase to accommodate the load. In this case, the fluid pressure in the line $C_1$, as the input line, will be high and therefore pressure in line $C_1$ will be communicated to the line 15 by way of the shuttle valve 14, while the relatively lower pressure in line $C_2$ will be communicated with the line 16 by way of shuttle valve 14. If the pressure differential $\Delta P$ is higher than the set point of the compensator valve 17, the compensator valve will open to allow flow of the high pressure fluid in line 15 into the chamber of the control piston 12 which will cause the piston to stroke in that the pressure on the control piston 12 from the line $CP_1$ will be high enough to overcome the fluid pressure force and spring load on control piston 13. Consequently, the displacement of the motor will increase. As displacement is increased, the pressure differential $\Delta P$ will decrease until there is a force balance on the spool. This will occur in the vicinity of the set point. If an opposing load on the output shaft 19 of the motor 10 is sufficiently high, determined by sizing, the motor 10 will operate at maximum displacement, with the compensator valve 17 fully ported to line 15. No regulation will then occur.

If an aiding load is applied to the output shaft 19, the pressure in the return line, line $C_2$ in the example, will be communicated with line 15 and that in supply line $C_1$ will be relatively lower and will be communicated with line 16. Again, the compensator valve 17 will open and the control piston will try to stroke the wobbler to increase the displacement of the motor 10. However, since line CP$_2$ is in communication with the return line C$_2$ by way of the valve 21, the pressure in line CP$_2$ will almost equal the pressure in line C$_2$. Since the pressure in line CP$_2$ acts on the somewhat larger control piston face area of control piston 13, augmented with the preload of spring 22, the control piston 13 will counter the force from the control piston 12 and stroke the displacement to a minimum. The flow out of line CP$_1$ will be either leakage to case or pumped into line 15. Thus, with aiding load, the motor will operate at minimum displacement. Its speed will be checked by the flow limiter 24 downstream of the valve 21. Also, if no load is applied, the situation described for aiding load will apply. The pressures in the lines C$_1$ and C$_2$ will be nearly equal but the spring pre-load and the larger face area in the control piston 13 will ensure that the displacement remains at minimum.

From the above, it can be seen that the apparatus and method for controlling the differential hydraulic pressure across a variable displacement hydraulic motor of the invention are useful in a power drive unit, particularly for an aircraft, for extracting power from a hydraulic power source, typically constant pressure, and delivering it to a rotary mechanical load, typically of the actuator type. The apparatus provides control for full four quadrant operation, that is, both positive and negative rotation of the motor, and of positive and negative load. Further, the apparatus provides the capability to start and stop rotation of the motor in either direction under both positive and negative loads as commanded by the electronic controller. Moreover, the apparatus provides the ability to hydromechanically limit the maximum hydraulic flow consumed under opposing loads (positive rotation, positive load or negative rotation, negative load) by means of reducing the motor displacement so as to improve the efficiency of the power drive unit. In addition, the apparatus of the invention provides the ability to absorb an aiding load (positive rotation, negative load or negative rotation, positive load) without pumping hydraulic fluid back to the supply while limiting flow and thus speed.

This is accomplished in the apparatus of the invention through the use of the pressure compensator valve in combination with a shuttle valve so as to control pressure difference across the motor to be a constant set value for opposing loads for either direction of rotation, i.e., for positive rotation with an opposing load the motor displacement is varied to maintain the pressure in line C$_1$ a constant value above that in line C$_2$; for negative rotation with an opposing load line C$_2$ pressure is maintained a constant value above line C$_1$ pressure. This applies only within the limits of the motor displacement. With the motor at its maximum displacement, the pressure difference is higher than the set point, while it is lower than the set point for displacement at the minimum value. A conventional four-way electrohydraulic servo valve employed in combination with a flow limiter controls the motor motion for either direction of rotation with either opposing or aiding loads, i.e., true four quadrant operation.

The fluid pressure line running from the low pressure control piston 13 to the fluid line between the servo valve 21 and the flow limiter 24 functions to keep the motor 10 on the minimum displacement during aiding loads and avoids a stability problem inherent in the known apparatus of FIG. 1.

While I have shown and described only one embodiment in accordance with the present invention it is understood that the same is not limited thereto, but is susceptible to numerous changes and modifications as known to those skilled in the art. For example, the method and apparatus of the invention are not limited to use in an aircraft but could be employed for the control of hydraulic systems in other machinery. Therefore, I do not wish to be limited to the details shown or described herein, but intend to cover all such changes and modifications as are encompassed by the scope of the appended claims.

I claim:

1. An apparatus for controlling the differential hydraulic pressure across a variable displacement hydraulic motor having a wobbler which is adjustable for controlling the displacement of the motor and wherein said motor is subject to being operated under an opposing load and under an aiding load, said apparatus comprising first and second control pistons, means operatively connecting each of said pistons to the wobbler for adjusting the wobbler to respectively increase and decrease the motor displacement with actuation of said pistons, means responsive to the pressure difference between an input hydraulic fluid pressure to the motor and an output hydraulic fluid pressure from the motor for communicating the first control piston with the higher pressure one of the input hydraulic fluid and the output hydraulic fluid when the fluid pressure differential exceeds a predetermined amount, and means for communicating the second control piston with the pressure of the output hydraulic fluid during operation of the motor under both opposing load and aiding load motor operating conditions including the operating condition under aiding load where the fluid pressure differential exceeds said predetermined amount thereby improving the stability of operation of the apparatus.

2. An apparatus according to claim 1, further comprising means for limiting the maximum flow of hydraulic fluid output from the motor and thereby limiting the maximum motor speed.

3. An apparatus according to claim 1, further comprising valve means for selectively changing the direction of hydraulic fluid flow through the motor for reversing the direction of operation of the motor.

4. An apparatus according to claim 3, wherein said means for communicating the second control piston with the output hydraulic fluid communicates witth the output hydraulic fluid in a fluid return line downstream of said valve means.

5. An apparatus for mechanically actuating a device with a variable displacement hydraulic motor driven by hydraulic fluid from a hydraulic power supply, comprising a device to be mechanically actuated, a variable displacement hydraulic motor, means for mechanically connecting the output of the motor to said device for actuatting said device, a hydraulic power supply for supplying hydraulic fluid for driving the motor, fluid passage means for supplying pressurized hydraulic fluid to the motor from said hydraulic power supply and for returning pressurized hydraulic fluid from the motor to the hydraulic power supply, and means responsive to the hydraulic pressure differential between said supply pressurized fluid and said return pressurized fluid for controlling the hydraulic pressure differential across the motor by adjusting the displacement of the motor to maintain a near constant hydraulic pressure differential across the motor when the motor is operating under an opposing load in an intermediate region of its speed-load torque profile, and including means responsive to the pressure of the return pressurized fluid for automatically reducing and maintaining the displacement of the motor to a minimum when the motor is operating under an aiding load.

6. In a method of controlling the differential hydraulic pressure across a variable displacement hydraulic motor comprising the steps of adjusting the displacement of the motor as a function of the differential pressure across the motor for maintaining a near constant differential pressure across the motor when the motor is operating under an opposing load in an intermediate region of its speed-load torque profile, the improvement comprising reducing the displacement of the motor to a minimum when the motor experiences an aiding load thereby minimizing the flow requirements of the motor and maintaining the displacement of the motor to the minimum when the motor is operating under an aiding load even in the case the pressure differential across the motor exceeds said near constant differential pressure.

7. The method according to claim 6, wherein said step of reducing the displacement of the motor to a minimum is also performed when no load is applied to the motor.

8. The method according to claim 6, further including the step of limiting the maximum motor speed by limiting the flow of hydraulic fluid from said motor to a hydraulic fluid supply.

9. A method of controlling the differential hydraulic pressure across a variable displacement hydraulic motor for stabilizing the operation of the motor, said motor having a wobbler which is adjustable for controlling the displacement of the motor and first and second hydraulic pressure responsive control piston means for adjusting the wobbler to respectively increase and decrease the motor displacement depending upon the hydraulic pressures applied to said piston means, said method comprising the steps of applying hydraulic fluid pressure from the higher of an input hydraulic fluid pressure to said motor and an output hydraulic fluid pressure from said motor to the first control piston means when the pressure difference between the input hydraulic fluid pressure and the output hydraulic fluid pressure exceeds a predetermined amount, and, in case of an opposing load on the motor, applying hydraulic fluid pressure from the output hydraulic pressure from the motor to the second control piston means whereby said first control piston means overrides said second control piston means and the wobbler is adjusted to increase the motor displacement, and, in the case of an aiding load on the motor, applying hydraulic fluid pressure from said output hydraulic fluid pressure to the second control piston means, said second control piston means having a piston with a larger piston face area than that of a piston of said first piston control piston means whereby the first control piston means is overridden by said second control piston means so that the wobbler is adjusted to decrease the motor displacement to a minimum thereby minimizing the hydraulic fluid flow requirements of the motor.

10. The method according to claim 9, further comprising the step of limiting the maximum motor speed by limiting the flow of hydraulic fluid output from the motor.

11. A metthod of stabilizing operation of a variable displacement hydraulic motor and of reducing the peak flow requirement on a hydraulic power supply which drives the motor for mechanically actuating a device, comprising controlling the differential hydraulic fluid pressure across said variable displacement hydraulic motor operating under an opposing load by adjusting the displacement of the motor as a function of the differential fluid pressure across the motor for maintaining a near constant differential fluid pressure across the motor while the motor is operating in an intermediate region of its speed-load torque profile, and reducing the displacement of the motor to a minimum when said motor is operating under an aiding load thereby minimizing the flow requirements of the motor and maintaining the displacement of the motor to the minimum even in the case the hydraulic pressure differential across the motor exceeds said near constant differential fluid pressure.

12. The method according to claim 11, further comprising reducing the displacement of the motor to a minimum when said motor is acting under no load.

13. The method according to claim 11, further comprising limiting the maximum motor speed by limiting the flow of hydraulic fluid from said motor.

* * * * *